United States Patent
Fujimoto (12)

(10) Patent No.: US 6,411,942 B1
(45) Date of Patent: *Jun. 25, 2002

(54) ELECTRONIC TRANSACTION SYSTEM AND SYSTEMS FOR ISSUING AND EXAMINING ELECTRONIC CHECK

(75) Inventor: Shingo Fujimoto, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/625,419

(22) Filed: Mar. 29, 1996

(30) Foreign Application Priority Data

Aug. 18, 1995 (JP) .............................. 7-210558

(51) Int. Cl.⁷ .............................................. G06F 17/00
(52) U.S. Cl. ........................................ 705/64; 713/176
(58) Field of Search ............................ 380/24; 395/239, 395/240, 242, 244; 705/39, 64, 46, 42, 44, 33; 713/176

(56) References Cited

U.S. PATENT DOCUMENTS

| | | | | |
|---|---|---|---|---|
| 3,990,558 A | * | 11/1976 | Ehrat ........................ 194/4 R |
| 4,529,870 A | * | 7/1985 | Chaum ....................... 235/380 |
| 4,759,063 A | | 7/1988 | Chaum ........................ 380/30 |
| 4,977,595 A | * | 12/1990 | Ohta ........................... 380/24 |
| 4,987,593 A | * | 1/1991 | Chaum ......................... 380/3 |
| 5,224,162 A | * | 6/1993 | Okamoto et al. ............. 380/24 |
| 5,237,159 A | * | 8/1993 | Stephens et al. ............. 235/379 |
| 5,373,558 A | * | 12/1994 | Chaum ........................ 380/23 |
| 5,420,926 A | * | 5/1995 | Lou et al. .................... 380/24 |
| 5,440,634 A | * | 8/1995 | Jones et al. .................. 380/24 |
| 5,509,692 A | | 4/1996 | Oz ............................. 283/70 |
| 5,511,121 A | * | 4/1996 | Yacobi ......................... 380/24 |
| 5,521,980 A | * | 5/1996 | Brands ......................... 380/30 |
| 5,594,225 A | * | 1/1997 | Botvin ........................ 235/379 |
| 5,615,110 A | * | 3/1997 | Wong ......................... 335/238 |
| 5,623,547 A | * | 4/1997 | Jones et al. .................. 380/24 |
| 5,668,878 A | * | 9/1997 | Brands ......................... 380/30 |
| 5,677,955 A | * | 10/1997 | Doggett et al. ............... 380/24 |
| 5,832,089 A | * | 11/1998 | Kravitz et al. ............... 705/64 |
| 6,175,921 B1 | * | 1/2001 | Rosen ........................ 713/173 |

FOREIGN PATENT DOCUMENTS

JP 410027196 A * 1/1998

OTHER PUBLICATIONS

J. Downes and J.E. Goodman, "Dictionary of Finance and Investment Terms" 4th Edition (Barron's Educational Press, 1995) pp. 151, 280, and 410.
Derwent–All–No: 1999–590885; Mori, N. et al., Jan. 2001.*
"Nikkei Communications", pp. 78–85, 1996.

* cited by examiner

Primary Examiner—James P. Trammell
Assistant Examiner—Pierre E. Elisca
(74) Attorney, Agent, or Firm—Staas & Halsey LLP (57) ABSTRACT

An electronic transaction system operable on an all-purpose communication system, the transaction system allowing the use of an electronic check on which drawees' digital signatures are added using a public key cryptosystem to prevent the illegal alteration or raising of the checks. The electronic checks are allowed to be transmitted and received through the all-purpose communication system such as an electronic mail system.

6 Claims, 7 Drawing Sheets

ELECTRONIC TRANSACTION SYSTEM AND SYSTEMS FOR ISSUING AND EXAMINING ELECTRONIC CHECK

BACKGROUND OF THE INVENTION

1. Field of the Invention

The present invention relates to an electronic transaction system using an electronic check, and an issue system and an examination system for the electronic check.

2. Description of the Related Art

Figure 1:
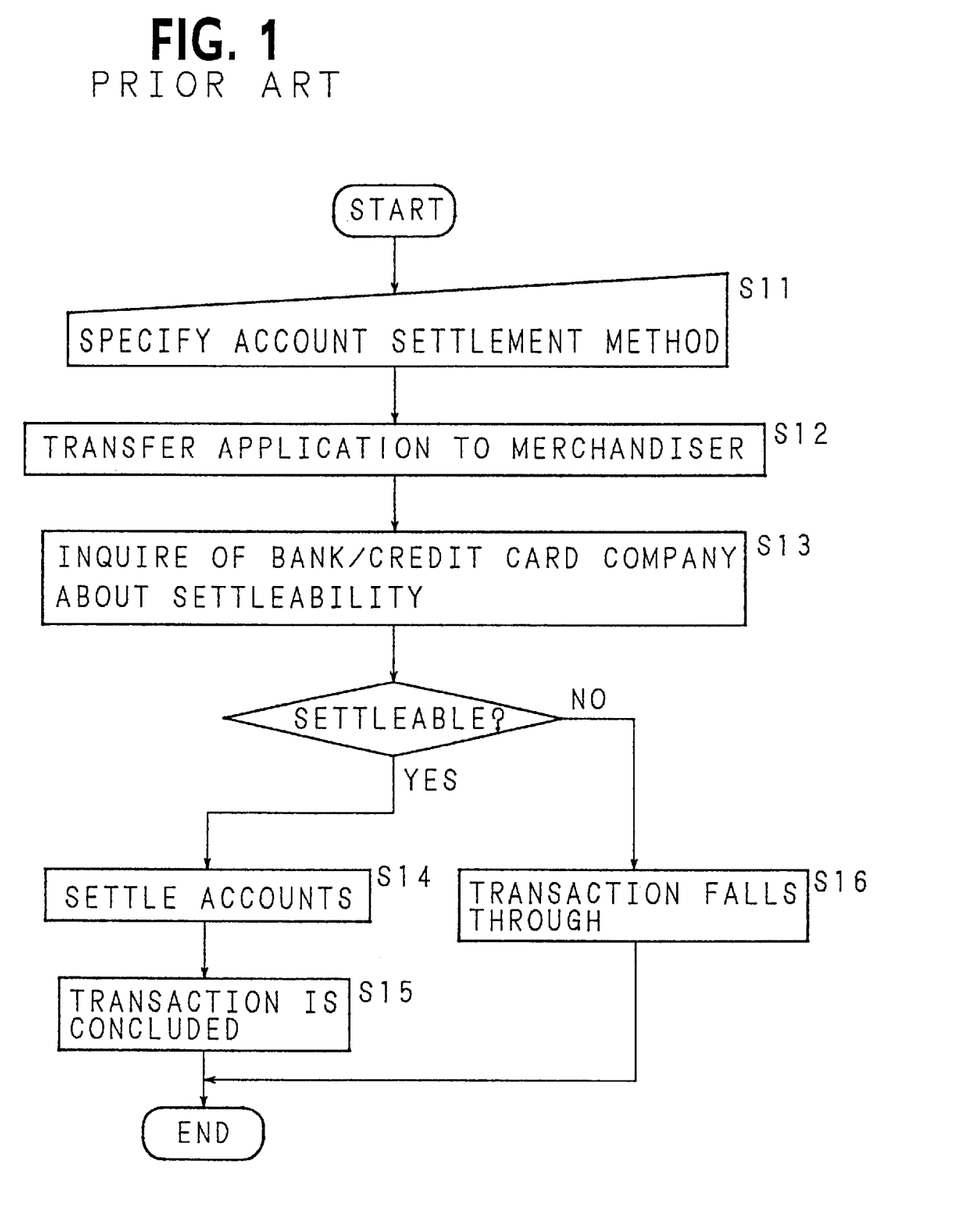
FIG. 1 is a PRIOR ART flowchart of conventional electronic transaction.

FIG. 1 is a flowchart of an electronic transaction for online shopping or the like among a consumer, a bank/credit card company and a merchandiser.

A consumer completes an electronic purchase application and specifies how to settle the account (S11). When the consumer choses to pay by bank transfer or a credit card, he writes his bank account number or his credit card number in the application.

When the application is transferred to a merchandiser (S12), the merchandiser confirms the contents of the application and makes inquiries at a paying agent, that is, the bank or the credit card company, about whether the account can be settled by the method specified by the consumer (S13).

If the consumer's balance at the bank account or the consumer's overdraft at the bank or the credit card company exceeds the payment so that the consumer is solvent, the bank or the credit card company settles the account (S14). Before or after the payment, the goods are sent to the consumer, and the transaction is concluded (S15). However, if the consumer is insolvent, the transaction falls through (S16).

In the conventional electronic commerce as above, private information such as a bank account number and a credit card number are informed to a merchandiser in every transaction. Therefore, the risks of leakage of the private information and illegal use of the private information are always involved. In addition, it is difficult to detect an illegal transaction through such illegal use of private information.

Owing to such risks, the reliability on the electronic commerce is low. Furthermore, the upper limit of an amount of money dealt with in the electronic commerce is suppressed so as to minimize a damage caused by the illegal use of private information.

On the other hand, electronic commerce conducted through a leased line has a high reliability, but is not widely utilized because only a limited number users can access the leased line.

An, an electronic transaction system of for circulating digital cash has been proposed (U.S. Pat. No. 4,759,063, etc.). The '063 patent discloses the fundamental principle of digital cash utilizing a blind signature is based on the RSA cryptosystem. First, a user generates an arbitrary numeral X corresponding to his own signature, and a random numeral R, and calculates these numerals with a public key of a bank. The result of the calculation, that is, an enciphered data, is sent to the bank. The bank cannot obtain the arbitrary numeral X corresponding to the signature of the user because the enciphered data has been obtained on the basis of the calculation using the random numeral. Under this condition, the bank adds to the data a digital signature corresponding to an amount of money by using its own private key, and the resultant data is sent back to the user. The user obtains the numeral X added with the digital signature of the bank from the enciphered data with the bank signature by using his own public key, namely, obtains the money, which is to be used for the payment.

In order to circulate the digital cash using a blind signature, it is necessary to unify the format of data to be transferred in the electronic transaction system because a signature as well as an amount of money should be enciphered. In addition, since a complicated method is required for the encryption, the electronic transaction system becomes large scale. Therefore, a general user cannot easily introduce such a large scale system. Furthermore, since the amount of money is unitized in a predetermined unit, an arbitrary amount of money cannot be dealt with.

Furthermore, a lot of banks in the North America have established the FSTC (Financial Services Technology Consortium) and are trying to provide electronic check services on INTERNET (pp. 78–85, "Nikkei Communications", 1996.1.1). The mechanism of the electronic check is that when a consumer, who holds a serially numbered checkbook, inputs data in an order sheet on a screen offered by a merchandiser, the consumer also inputs an amount and the serial number of the checkbook on a check on the screen and adds an electronic signature by his own private key based on the RSA cryptosystem. The merchandiser confirms that the consumer is genuine by checking an open key of the consumer, then transmits the electronic check to a bank to cash the check.

However, it is unknown whether the consumer is solvent for the amount of the check in the above system when the consumer inputs the amount. Consequently, the payment is not guaranteed until the check is to be cashed, whereby the upper limit of the amount in the transaction is suppressed in order to prevent the risk.

SUMMARY OF THE INVENTION

The present invention was devised to overcome the aforementioned problems.

In the electronic transaction system of this invention, an electronic check including an electronic signature of an issuer and information on an account to be settled is issued by the issuer apparatus to a drawer apparatus in response to a demand from the drawer apparatus; the drawer adds his electronic signature to the issued electronic check, so as to make the electronic check settleable; a payee apparatus of the electronic check which has been made settleable by the electronic signature of the drawer examines the electronic signature of the drawer included in the electronic check, so as to certify the drawer of the electronic check; and a paying agent apparatus examines the contents of the electronic check which is demanded to be settled by the payee apparatus of the electronic check, so as to determine whether the electronic check is settleable, and settles the account when it is settleable.

Alternatively, in the electronic transaction system of this invention, an electronic check including an electronic signature of an issuer and information on a sum to be settled is issued by the issuer apparatus to a drawer apparatus in response to a demand from a payee apparatus; the drawer adds his electronic signature to the issued electronic check so as to make the electronic check settleable; and a paying agent apparatus examines the contents of the electronic check which has been made settleable by the electronic signature of the drawer, so as to determine whether the electronic check is settleable, and settles the account when it is settleable.

Furthermore, in the electronic transaction system of the invention, an electronic check with an electronic signature is circulated among the parties concerned. Private information such as a bank account number, a credit card number and a credit level is prevented from leaking. The electronic check on which the electronic signature is added by using a public key cryptosystem is practically impossible to be altered and forged, and in addition, the electronic check is unsettleable until a drawer adds his own electronic signature. Therefore, cashing on an illegal demand can be prevented.

Furthermore, in the electronic transaction system of the invention, the electronic check can be transmitted and received through a widely used communication system such as an electronic mail system. Therefore, the system can be configured at a low cost and can be utilized by a general user without leasing a line.

Additionally, in the electronic transaction system of the invention, the settlement can be guaranteed because the drawer confirms the sum to pay before adding his electronic signature.

Further, in the electronic transaction system of the invention, the payment is surely guaranteed because an issuer issues an electronic check adding his electronic signature after certifying solvency of a drawer for an amount on the electronic check, which is previously indicated by the drawer.

Moreover, in the electronic transaction system of the invention, there is no need for a drawer to demand for the issue of an electronic check.

Furthermore, in the electronic transaction system of the invention, settlement for one electronic check twice is prevented.

Further, in the electronic transaction system of the invention, illegal conversion by a demander who is not an inherent payee can be avoided.

The electronic check of this invention includes an electronic signature by the public key cryptosystem, and hence it is practically impossible to alter and forge the electronic check. In addition, the electronic check cannot be settled until a drawer adds his own electronic signature. Therefore, illegal conversion on a dishonest demand can be prevented.

Additionally, in the system of this invention for issuing an electronic check, there is no need for a drawer to demand the issue of an electronic check.

Furthermore, in the system of this invention for issuing an electronic check, double issue of an electronic check can be avoided.

In addition, an electronic check issued by the system of this invention for issuing an electronic check is prevented from being illegally converted by a demander who is not an inherent payee.

In the system of this invention for examining an electronic check, the legality of a drawer of an electronic check can be determined on the basis of the calculation on an electronic signature contained in the electronic check with a computer, so as to confirm the legality of the drawer of the electronic check, that is, a payer, in a short period of time. Additionally, the system can be easily automated.

Furthermore, in the system of this invention for examining an electronic check, double settlement of one electronic check can be prevented.

Additionally, in the system of this invention for examining an electronic check, dishonest conversion by a demandant who is not an inherent payee can be avoided.

Accordingly, an object of the invention is to provide an electronic transaction system and a system for issuing an electronic check, in which an electronic check circulated among the parties concerned is practically impossible to alter and forge, so as to prevent illegal conversion; in which private information such as a bank account number and a credit card number is prevented from leaking to a third party; which can provide its service through a widely used communication system; and in which the settlement can be guaranteed.

Additionally, another object of the invention is to provide a system for examining an electronic check which can determine the legality of an electronic check on the basis of calculation with a computer, can be easily automated and can prevent illegal conversion by a dishonest demander.

The above and further objects and features of the invention will more fully be apparent from the following detailed description with accompanying drawings.

DETAILED DESCRIPTION OF THE PREFERRED EMBODIMENTS

Figure 2:
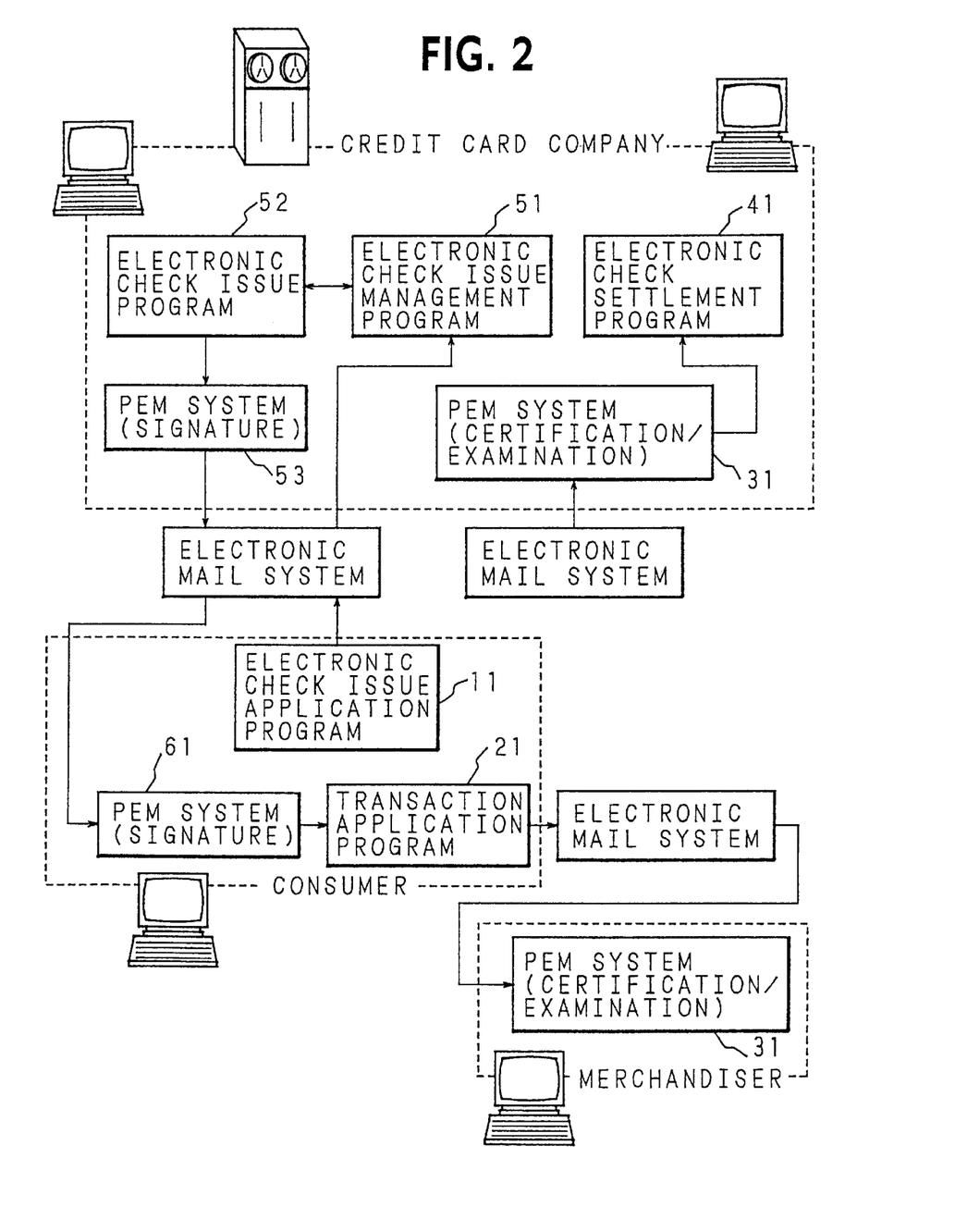
FIG. 2 is a block diagram showing an electronic transaction system according to a first embodiment of the invention.

FIG. 2 is a block diagram showing the configuration of an electronic transaction system according to a first embodiment of the invention, wherein a credit card company is assumed to be a paying agent.

The credit card company has a host computer and terminals such as a personal computer connected to the host computer. The host computer comprises the following programs: An electronic check issue management program 51 for confirming whether an electronic check applied for by a consumer is issuable, and for issuing the electronic check including a sum applied for by the consumer and a serial issuance number by using an electronic check issue program 52 when confirming the electronic check to be issuable; a PEM system (for signature) 53 for adding an electronic signature of the credit card company to the electronic check issued by the electronic check issue program 52; a PEM system (for certification/examination) 31 for examining the contents (such as electronic signatures of the credit card company and a consumer, and an issuance number) of an electronic check which is demanded to be settled by a merchandiser, so as to determine whether the account can be settled; and an electronic check settlement program 41 for settling the account of the electronic check when the PEM system 31 determines that it is settleable. The fundamental principle of the electronic signature is that an alteration by a third person can be detected since an enciphered message which is possible to be made in person by utilizing the open key cryptosystem such as RSA, is only possible for the third person to obtain the original message by decipher but impossible to encipher the deciphered message identically with that the originator made.

A consumer has a personal computer or the like comprising the following programs: An electronic check issue application program 11 for applying issue of an electronic check to the credit card company by electronic mail; a PEM system (for signature) 61 for adding his own electronic signature to the electronic check with an electronic signature of the credit card company given by the PEM system (for signature) 53; and a transaction application program 21 for making an electronic application document to send together with the electronic check by filling the name of goods and the like to purchase.

A merchandiser has a personal computer or the like comprising a PEM system (for certification/examination) 31 for examining the electronic signature of a consumer included in the electronic check transmitted by the consumer so as to certify the drawer of the electronic check.

Figure 3A:
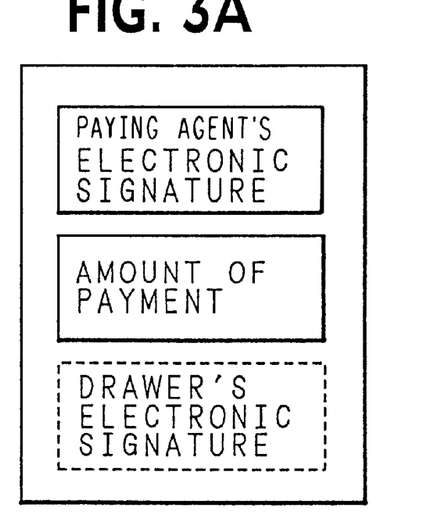
FIGS. 3A through 3C are conceptual diagrams of an electronic check used in the invention.
Figure 3B:
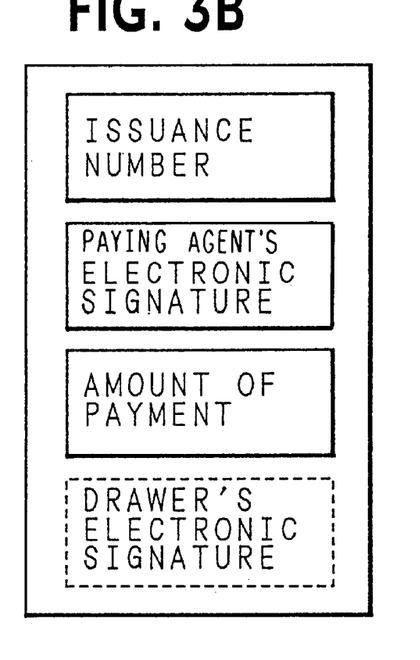
Figure 3C:
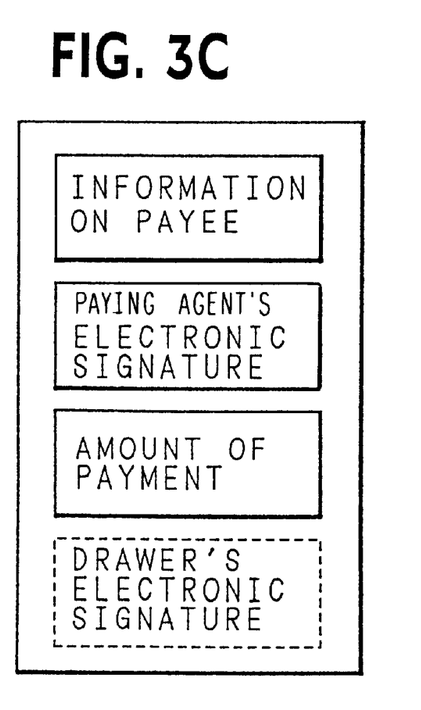

FIGS. 3A through 3C are conceptual diagrams of an electronic check used in the electronic transaction system of the invention. The electronic check used in the invention includes at least a sum to be settled and an electronic signature of the issuer of the electronic check, that is, the paying agent such as a bank and a credit card company. After the issue, the electronic signature of a drawer is added to the electronic check, and thus the electronic check becomes settleable (as in the electronic check shown in FIG. 3A).

Alternatively, the electronic check used in the invention can include, in addition to the above-mentioned information, a unique issuance number for preventing double issue (as in the electronic check shown in FIG. 3B). Furthermore, the electronic check of the invention can further include information on a payee for preventing illegal conversion resulting from the theft of the check (as in the electronic check shown in FIG. 3C).

In the electronic check of the invention, the electronic signature of the issuer works as a watermark and a tally impression of a check, and the electronic signature of the drawer works as a handwritten signature.

For the electronic signatures of the issuer and the drawer of the electronic check, the PEM (privacy enhanced mail) system ("Open experiment of encryption mail FJPEM"; pp. 118–123, "UNIX MAGAZINE", 1994, May issue), the PGP (pretty good privacy) system or the like, which are known as an encryption mail system capable of an electronic signature and encryption communication, is used.

For example, in the PEM system, a specific value in accordance with an input data is calculated by using a function such as MD4 and MD5. However, since an inverse operation is difficult, a value of a message digest (working similarly to a checksum) for detecting alteration of a data in a file is ciphered by the RSA public key cryptosystem to be used as an electronic signature, and the electronic signature is examined after being deciphered.

Specifically, in the public key cryptosystem for obtaining an electronic signature used in the invention, a pair of a private key and a public key is used for ciphering a data. When a data is ciphered by using a private key, the enciphered data can be deciphered only by the paired public key. Therefore, when an enciphered data can be deciphered by a public key, the data is found to have been ciphered by the paired private key. Since merely one person has the private key, an electronic signature can be realized by making use of the private key.

More specifically, a hash value of a data to be made into an electronic signature is calculated, and the hash value is ciphered by using the private key and is added to the data as signature information. A person who received the data re-calculates the hash value of the received data, and compares the added signature information with a hash value of a data obtained by deciphering the enciphered data by using the public key paired with the private key. When the hash values coincide with each other, it is found that the data has not been altered and that the enciphered data has been sent from a consumer having the private key paired with the public key. Thus, the enciphered data can work as a signature of the consumer. When the hash values do not coincide with each other, alteration and forgery can be detected.

The PEM system and the PGP system are existing systems including obtaining means for managing a private key and means for obtaining a public key. Therefore, procedures such as "execution of an electronic signature" and "examination of an electronic signature" are inherently provided as commands, which can be easily used by a user.

Furthermore, a private key and a public key are generated by a random number generator provided to the PEM system and the PGP system, and include $2^{512}$ to $2^{1024}$ kinds (user's option). Therefore, the forgery of a private key is practically impossible.

Figure 4:
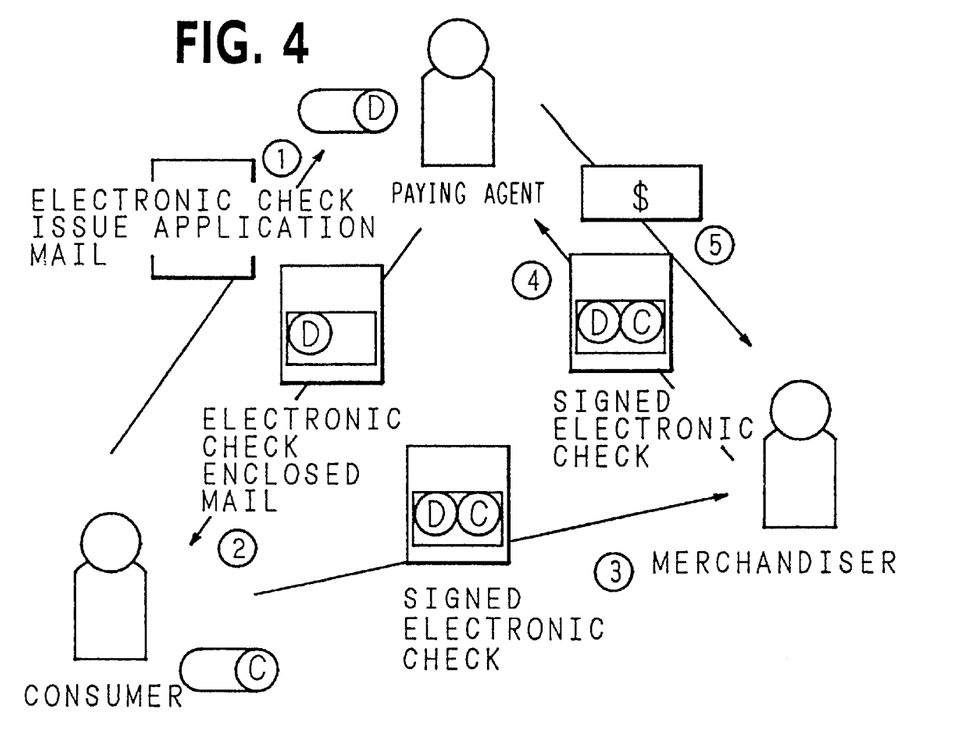
FIG. 4 is a conceptual diagram of the circulation of the electronic check of the first embodiment.
Figure 5:
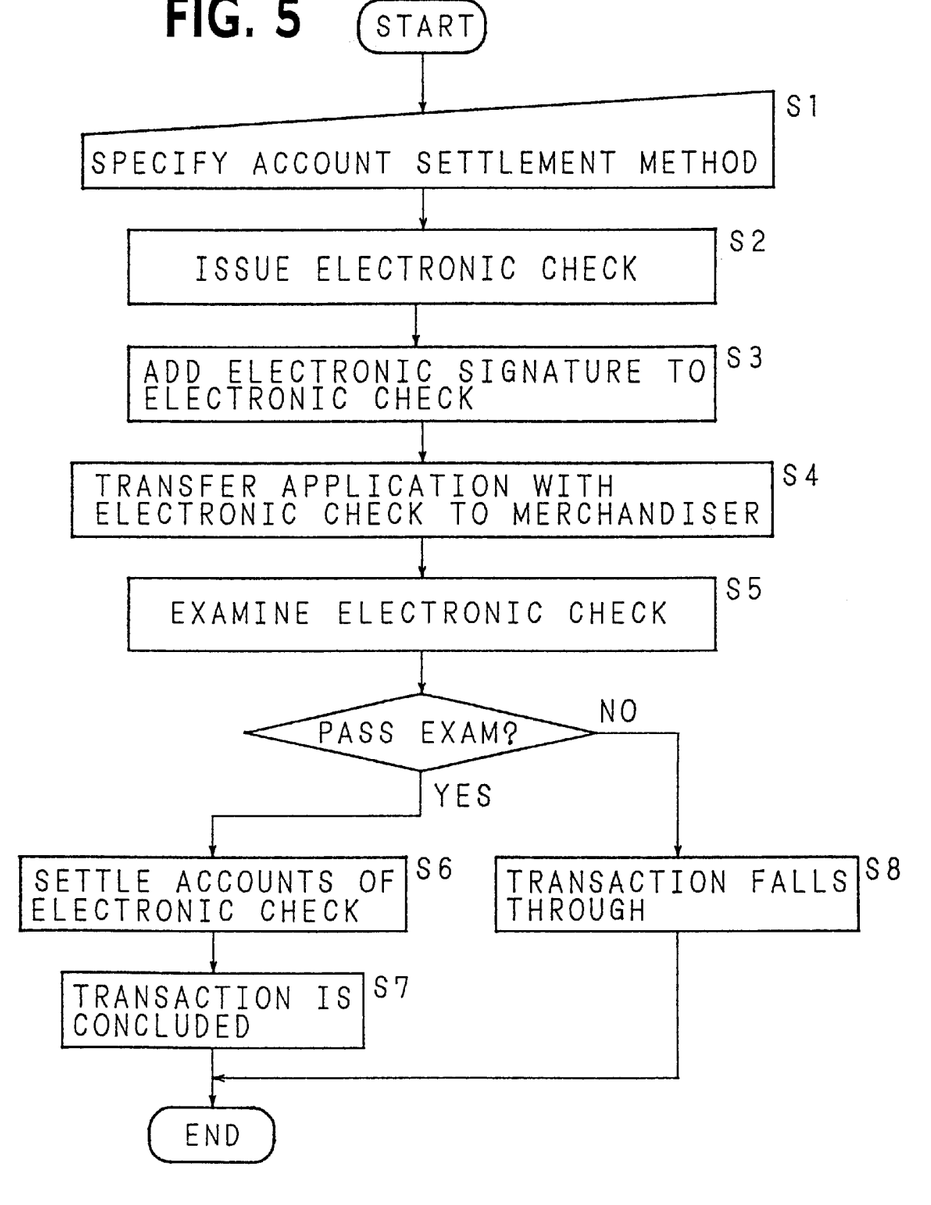
FIG. 5 is a flowchart of the electronic transaction of the first embodiment.

Now, the operation of the system of this embodiment will be described referring to a conceptual diagram of the circulation of the electronic check shown in FIG. 4 and a flowchart for the electronic transaction shown in FIG. 5.

A consumer makes an electronic document for purchase application for desired goods and specifies the transaction method in the application (S1). When the consumer selects a credit card company as a paying agent, the consumer activates the electronic check application program 11, and applies the credit card company for the issue of an electronic check of a sum corresponding to the price of the goods through an electronic mail system. In response to this application, the credit card company activates the electronic check issue management program 51 and confirms that the applied electronic check can be issued. Then, the credit card company activates the electronic check issue program 52 and issues an electronic check including a serial issuance number (ID) and the demanded sum. Then an electronic signature of the credit card company is added to the electronic check by using a private key of the credit card company for issue by means of the PEM system 53, and the resultant electronic check is transmitted to the consumer through the electronic mail system (S2).

The consumer confirms the sum of the received electronic check, and activates the PEM system 61 so as to add his own electronic signature for approval by using a private key of the consumer for approval. Thus, the electronic check becomes settleable (S3).

When, at this point, the consumer desires to stop the transaction, the electronic document of the electronic check can be discarded without adding the electronic signature.

The consumer transmits the electronic check including his own electronic signature together with a transaction application drawn by means of the transaction application program 21 to a merchandiser through the electronic mail system (S4).

The merchandiser extracts the electronic check from the received electronic mail, and obtains a public key for approval paired with the private key of the consumer and a public key for issue paired with the private key of the credit card company, so as to examine the contents of the electronic check by means of the PEM system 31 (S5). An electronic check having passed the examination is found to be legal and be settleable. The merchandiser transmits the electronic check having passed the examination by means of the PEM system 31 to the credit card company through the electronic mail system.

The credit card company activates the PEM system 31 so as to examine the contents of the electronic check transmitted from the merchandiser, and also activates the electronic check settlement program 41, so as to confirm that an electronic check having the same issuance number has not been cashed (S5). When the electronic check is confirmed to be legal, the account of the electronic check is settled (S6), and the transaction is concluded (S7). However, when the electronic check is not confirmed to be legal, the transaction falls through (S8).

Figure 6:
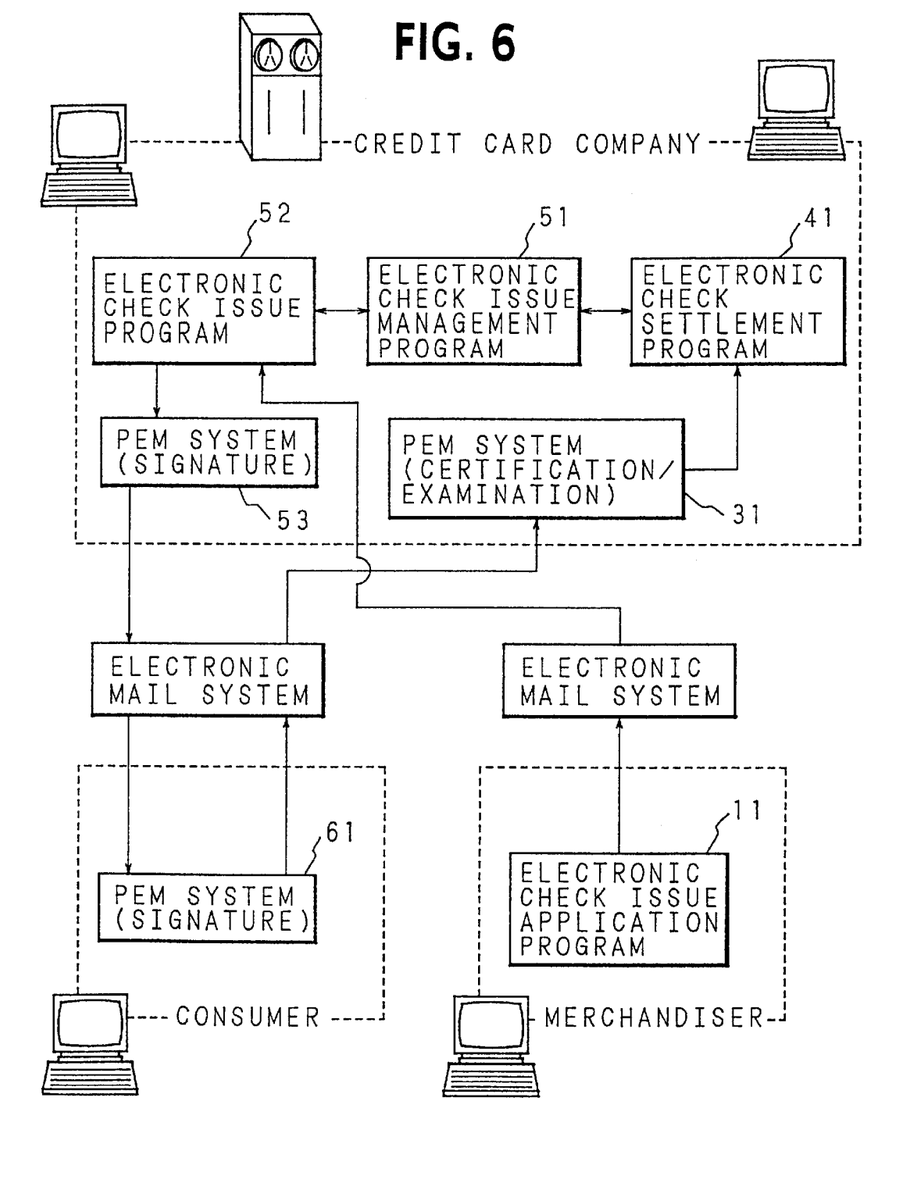
FIG. 6 is a block diagram showing an electronic transaction system according to a second embodiment of the invention.

FIG. 6 is a block diagram showing the configuration of an electronic transaction system according to a second embodiment of the invention. This embodiment is different from the aforementioned embodiment in which the issue of an electronic check is applied for by a merchandiser and there is no need for a consumer to apply for it. Such an electronic transaction system is applicable to the payment of public utility charges and the like. The consumer can add his own electronic signature on an electronic check issued by a credit card company after confirming the sum of the check.

The credit card company has a host computer and terminals such as a personal computer connected to the host computer. The host computer comprises the following programs: An electronic check issue management program 51 for confirming whether an electronic check applied for by a merchandiser is issuable, and for issuing the electronic check including a sum applied for by the merchandiser, a serial issuance number and information on a payee specified by the merchandiser by using an electronic check issue program 52 when confirming the electronic check to be issuable; a PEM system (for signature) 53 for adding an electronic signature of the credit card company to the electronic check issued by the electronic check issue program 52; a PEM system (for certification/examination) 31 for examining the contents (such as electronic signatures of the credit card company and a consumer, an issuance number and information on a payee) of an electronic check which is transmitted back from a consumer, so as to determine whether the account can be settled; and an electronic check settlement program 41 for settling the account of the electronic check when the PEM system 31 determines that it is settleable.

A consumer has a personal computer or the like comprising a PEM system (for signature) 61 for adding his own electronic signature to the electronic check on which the credit card company has added his electronic signature by means of the PEM system (for signature) 53.

A merchandiser has a personal computer or the like comprising an electronic check issue application program 11 for applying the credit card company for the issue of an electronic check by an electronic mail.

Figure 7:
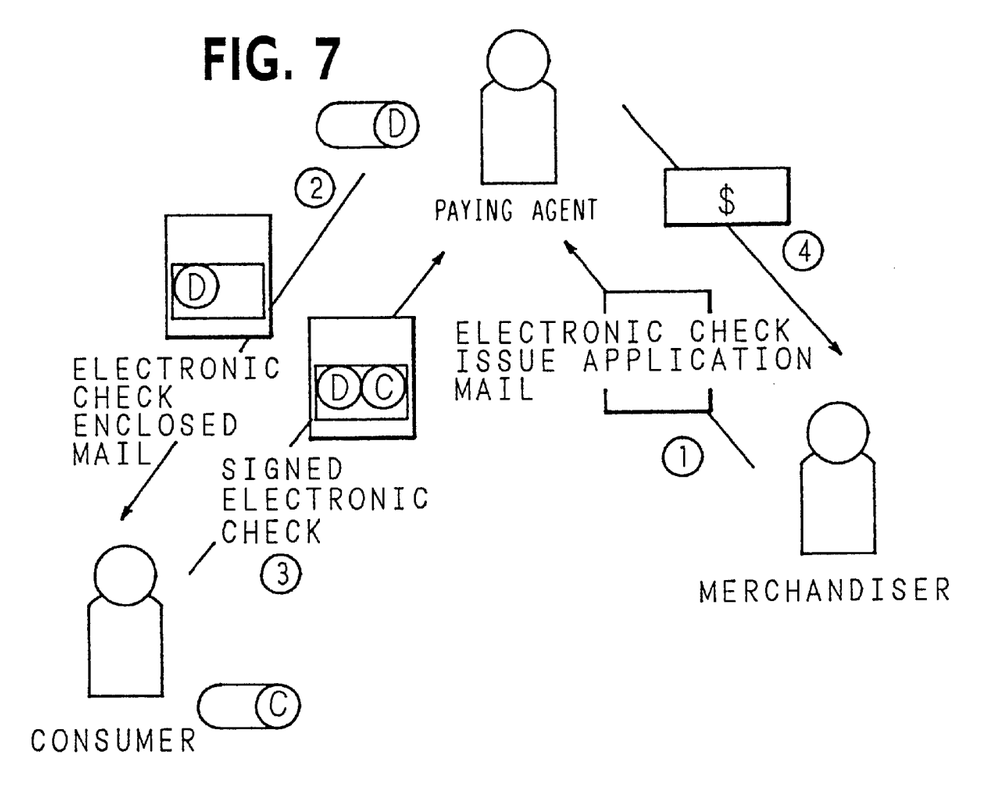
FIG. 7 is a conceptual diagram of the circulation of an electronic check of the second embodiment.

Now, the electronic transaction in accordance with the second embodiment will be described referring to a conceptual diagram of the circulation of an electronic check shown in FIG. 7.

In order to demand the payment of a consumer, a merchandiser activates the electronic check issue application program 11, and applies a credit card company, a paying agent, for the issue of an electronic check of a sum corresponding to the payment through the electronic mail system (1). In response to this application, the credit card company activates the electronic check issue management program 51, so as to confirm that the demanded electronic check can be issued. Then the credit card company activates the electronic check issue program 52, so as to issue an electronic check including a serial issuance number (ID), a sum to pay and information on the merchandiser, i.e., a payee. The credit card company adds to the electronic check his electronic signature by using a private key of the credit card company for issue, and transmits the resultant electronic check to the consumer (2).

The consumer confirms the sum of the received electronic check, and activates the PEM system 61, so as to add to the check his own electronic signature for approval by using a private key of the consumer. Thus, the electronic check becomes settleable.

The consumer transmits the resultant electronic check to the credit card company through the electronic mail system (3).

The credit card company activates the PEM system 31, so as to examine the contents of the electronic check transmitted from the consumer, and also activates the electronic check settlement program 41, so as to confirm that an electronic check having the same issuance number has not be cashed. When the legality of the electronic check is confirmed, the account is settled and the transaction is concluded (4). However, when the legality of the electronic check is not confirmed, the transaction falls through.

In these embodiments, the description has been made on an electronic transaction system in which an electronic check is circulated among a credit card company, a consumer and a merchandiser through the electronic mail system. However, a method for transmitting and receiving the electronic check is not limited to the electronic mail system, but can be any other system usable on a network such as INTERNET.

Furthermore, in these embodiments, the issuer of an electronic check is identical to a paying agent. However, the paying agent is not necessarily identical to the issuer but can be any one having means for determining whether the account of an electronic check can be settled.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method comprising:
   issuing an electronic check by an issuer in response to an issuance request from a drawer, the issued check including a digital signature of the issuer, a settlement amount of money and an issuance number;
   electronically transmitting the issued check from the issuer to the drawer;
   receiving, by the drawer, the check transmitted from the issuer;
   adding, by the drawer, a digital signature of the drawer to the received check, the check thereby being ready for settlement; and
   electronically transmitting the check ready for settlement to a payee.

2. The method according to claim 1, further comprising:
   receiving, by the payee, the transmitted check ready for settlement;
   confirming, by the payee, in accordance with the digital signature of the issuer, that the check received by the payee is legal and settleable.

3. The method according to claim 2, further comprising:

electronically transmitting, by the payee, the confirmed check to the issuer; and receiving, by the issuer, the check transmitted from the payee; and confirming, by the issuer, that the check received by the issuer is legal and settleable.

4. A method according to claim 1, further comprising:

specifying, by the drawer, a payee on the check received by the drawer.

5. An apparatus comprising:

means for issuing an electronic check by an issuer in response to an issuance request from a drawer, the issued check including a digital signature of the issuer a settlement amount of money and an issuance number;

means for electronically transmitting the issued check from the issuer to the drawer;

means for receiving, by the drawer, the check transmitted from the issuer;

means for adding, by the drawer, a digital signature of the drawer to the received check, the check thereby being ready for settlement; and means for electronically transmitting the check ready for settlement to a payee.

6. An apparatus according to claim 5, further comprising:

means for specifying, by the drawer, the payee on the check received by the drawer.

* * * * *